United States Patent
Han et al.

(10) Patent No.: US 8,938,119 B1
(45) Date of Patent: Jan. 20, 2015

(54) FACADE ILLUMINATION REMOVAL

(75) Inventors: Mei Han, Palo Alto, CA (US); Vivek Kwatra, Santa Clara, CA (US); Shengyang Dai, San Jose, CA (US); Sergey Ioffe, Mountain View, CA (US)

(73) Assignee: Google Inc., Mountain View, CA (US)

( * ) Notice: Subject to any disclaimer, the term of this patent is extended or adjusted under 35 U.S.C. 154(b) by 441 days.

(21) Appl. No.: 13/461,482

(22) Filed: May 1, 2012

(51) Int. Cl.
*G06K 9/00* (2006.01)

(52) U.S. Cl.
USPC ........................................................ 382/163

(58) Field of Classification Search
USPC ................. 382/162–167, 274–275, 254, 284; 358/3.26–3.27
See application file for complete search history.

(56) References Cited

U.S. PATENT DOCUMENTS

| | | | |
|---|---|---|---|
| 5,081,656 A | 1/1992 | Baker et al. | |
| 5,325,449 A | 6/1994 | Burt et al. | |
| 5,488,674 A | 1/1996 | Burt et al. | |
| 5,497,430 A | 3/1996 | Sadovnik et al. | |
| 5,761,329 A | 6/1998 | Chen et al. | |
| 5,963,670 A | 10/1999 | Lipson et al. | |
| 6,005,247 A | 12/1999 | Baum | |
| 6,201,541 B1 | 3/2001 | Shalom et al. | |
| 6,249,601 B1 | 6/2001 | Kim et al. | |
| 6,249,616 B1 | 6/2001 | Hashimoto | |
| 6,253,173 B1 | 6/2001 | Ma | |
| 6,381,376 B1 * | 4/2002 | Toyoda ........................ | 382/284 |
| 6,459,821 B1 | 10/2002 | Cullen | |
| 6,463,426 B1 | 10/2002 | Lipson et al. | |
| 6,466,694 B2 | 10/2002 | Kamada et al. | |
| 6,516,085 B1 | 2/2003 | Wiley et al. | |
| 6,535,650 B1 | 3/2003 | Poulo et al. | |
| 6,594,384 B1 * | 7/2003 | Kim et al. ................... | 382/162 |
| 6,674,890 B2 | 1/2004 | Maeda et al. | |
| 6,675,174 B1 | 1/2004 | Bolle et al. | |
| 6,681,056 B1 | 1/2004 | Tseng et al. | |
| 6,683,984 B1 | 1/2004 | Simske et al. | |
| 6,762,769 B2 | 7/2004 | Guo et al. | |
| 6,788,812 B1 * | 9/2004 | Wilkins ........................ | 382/167 |
| 6,826,300 B2 | 11/2004 | Liu et al. | |
| 6,898,331 B2 | 5/2005 | Tiana | |
| 7,006,671 B2 | 2/2006 | Yamaguchi | |
| 7,120,626 B2 | 10/2006 | Li et al. | |
| 7,146,036 B2 * | 12/2006 | An Chang et al. ............ | 382/154 |
| 7,315,642 B2 | 1/2008 | Bartov | |
| 7,376,251 B2 | 5/2008 | Stober | |
| 7,388,979 B2 | 6/2008 | Sakai et al. | |
| 7,447,338 B2 | 11/2008 | Kim | |

(Continued)

OTHER PUBLICATIONS

Arbel, E. et al., Texture-preserving shadow removal in color images containing curved surfaces. In CVPR, 2007.

(Continued)

*Primary Examiner* — Ishrat I Sherali
(74) *Attorney, Agent, or Firm* — Dority & Manning, P.A.

(57) ABSTRACT

An image comprising color pixels with varying illumination is selected. Instances of a repeating pattern in the image are determined. Illumination values for illuminated pixels at locations within instances of the repeating pattern are calculated based on pixel intensities of non-illuminated pixels at corresponding locations in other instances of the repeating pattern. The illumination variation is removed from the illuminated pixels based on the calculated illumination values to produce enhanced pixels. Color from the non-illuminated pixels at the corresponding locations in other instances of the repeating pattern is propagated to the enhanced pixels.

20 Claims, 8 Drawing Sheets

(56) References Cited

U.S. PATENT DOCUMENTS

| | | | |
|---|---|---|---|
| 7,599,576 B2* | 10/2009 | Baldwin | 382/275 |
| 7,668,787 B2 | 2/2010 | Bier | |
| 7,697,746 B2 | 4/2010 | Kawaguchi | |
| 7,724,960 B1 | 5/2010 | Mikhael et al. | |
| 7,734,097 B1 | 6/2010 | Porikli et al. | |
| 7,778,488 B2 | 8/2010 | Nord et al. | |
| 7,783,102 B2 | 8/2010 | Kawaragi | |
| 7,941,004 B2 | 5/2011 | Zhu et al. | |
| 7,957,565 B1 | 6/2011 | Sharma et al. | |
| 8,001,157 B2 | 8/2011 | Bier | |
| 8,005,292 B2 | 8/2011 | Sakai et al. | |
| 8,090,429 B2 | 1/2012 | Vija et al. | |
| 8,103,090 B2 | 1/2012 | Ma et al. | |
| 8,131,786 B1 | 3/2012 | Bengio et al. | |
| 8,144,978 B2* | 3/2012 | Maxwell et al. | 382/164 |
| 8,391,634 B1* | 3/2013 | Kwatra et al. | 382/274 |
| 8,503,800 B2* | 8/2013 | Blonk et al. | 382/226 |
| 8,761,497 B2* | 6/2014 | Berkovich et al. | 382/155 |
| 8,798,393 B2* | 8/2014 | Kwatra et al. | 382/274 |
| 2001/0055429 A1 | 12/2001 | Hirosawa et al. | |
| 2003/0142860 A1 | 7/2003 | Glasser et al. | |
| 2003/0169906 A1 | 9/2003 | Gokturk et al. | |
| 2003/0190090 A1 | 10/2003 | Beeman et al. | |
| 2004/0032979 A1 | 2/2004 | Honda et al. | |
| 2005/0100209 A1 | 5/2005 | Lewis et al. | |
| 2005/0149494 A1 | 7/2005 | Lindh et al. | |
| 2005/0163397 A1 | 7/2005 | Baldwin | |
| 2005/0179910 A1 | 8/2005 | Bartov | |
| 2006/0017739 A1 | 1/2006 | Fang et al. | |
| 2006/0023944 A1 | 2/2006 | Oisel et al. | |
| 2006/0215882 A1 | 9/2006 | Ando et al. | |
| 2007/0050411 A1 | 3/2007 | Hull et al. | |
| 2007/0183629 A1 | 8/2007 | Porikli et al. | |
| 2007/0269107 A1 | 11/2007 | Iwai et al. | |
| 2007/0280556 A1 | 12/2007 | Mullick et al. | |
| 2007/0282935 A1 | 12/2007 | Khan et al. | |
| 2007/0297653 A1 | 12/2007 | Bolle et al. | |
| 2008/0118151 A1 | 5/2008 | Bouguet et al. | |
| 2008/0118160 A1 | 5/2008 | Fan et al. | |
| 2008/0130960 A1 | 6/2008 | Yagnik | |
| 2008/0235216 A1 | 9/2008 | Ruttenberg | |
| 2009/0034835 A1 | 2/2009 | Maxwell et al. | |
| 2009/0274385 A1 | 11/2009 | Zhu et al. | |
| 2011/0035035 A1 | 2/2011 | Khan et al. | |
| 2011/0158533 A1 | 6/2011 | Gutelzon et al. | |
| 2011/0202528 A1 | 8/2011 | Deolalikar et al. | |
| 2011/0280453 A1 | 11/2011 | Chen et al. | |
| 2012/0020546 A1 | 1/2012 | Inoue et al. | |
| 2012/0141044 A1 | 6/2012 | Kwatra et al. | |

OTHER PUBLICATIONS

Awate, S. P. et al., Unsupervised, information-theoretic, adaptive image filtering for image restoration. IEEE Transactions on Pattern Analysis and Machine Intelligence, 28:364-376, 2006.
Bell, M. et al., Learning local evidence for shading and reflectance. In ICCV, 2001.
Boiman, O., et al., In defense of nearest-neighbor based image classification, IEEE Conference on Computer Vision and Pattern Recognition, Jun. 23-28, 2008, pp. 1-8.
Bousseau, A. et al., User-assisted intrinsic images. In SIGGRAPH Asia, 2009.
Cao, G., et al., "Covariance estimation for high dimensional data vectors using the sparse matrix transform," In Daphne Koller, Dale Schuurmans, Yoshua Bengio, and Lon Bottou, editors, NIPS, pp. 225-232. MIT Press, 2008.
Dai, S., et al., "Soft edge smoothness prior for alpha channel super resolution," IEEE Conference on Computer Vision and Pattern Recognition, 2007, 8 pages.
Datta, R. et al., "Content-Based Image Retrieval—Approaches and Trends of the New Age," MIR, 2005, pp. 1-10.
Deselaers, T. et al., "Features for Image Retrieval: An Experimental Comparison," Information Retrieval, 2008, pp. 1-22, vol. 11, No. 2.
Deselaers, T. et al., "Content-Based Image Retrieval, Tutorial Image Retrieval," Tutorial ICPR, 2008, pp. 1-66.
Efros, A., et al., "Image quilting for texture synthesis and transfer," Computer Graphics Annual Conference (SIGGRAPH 2001); Los Angeles, CA; United States; Aug. 12-17, 2001. pp. 341-346.
Efros, A., et al., "Texture Synthesis by Non-parametric Sampling," $7^{th}$ IEEEE International Conference on Computer Vision, Sep. 20-27, 1999, 10 Pages.
Elad, M., et al., "Restoration of single super-resolution image from several blurred, noisy and down-sampled measured images," IEEE Transactions on Image Processing, Dec. 1997, pp. 1646-1658, vol. 6, No. 12.
Elkan, C., Using the triangle inequality to accelerate k-means, Proceedings of the Twentieth International Conference on Machine Learning (ICML-2003), Washington DC, 2003, 7 pages.
Farsiu, S., et al., "Fast and robust multiframe super resolution," IEEE Transactions on Image Processing, Oct. 2004, pp. 1327-1344, vol. 13, Is. 10.
Finlayson, G. et al., Entropy minimization for shadow removal. International Journal of Computer Vision, 2009.
Finlayson, G. et al., Detecting illumination in images. In ICCV, 2007.
Finlayson, G.D., et al., Removing shadows from images, ECCV 2002: European Conference on Computer Vision, 2002, 14 pages.
Freeman, W.T., et al., "Example-based super resolution," IEEE Computer Graphics and Applications, 2002, 14 pages.
Finlayson, G. D. et al., Intrinsic images by entropy minimization. In ECCV, 2004.
Grauman, K., et al., "Approximate correspondence in high dimensions," In NIPS, 2006, 8 pages.
Han, J., et al., "Fast example-based surface texture synthesis via discrete optimization," The Visual Computer, 2006, pp. 918-925, vol. 22.
Hays, J., et al., "Scene completion using millions of photographs," ACM Transactions on Graphics Graph, 2007, vol. 26, No. 3.
Higham, N.J., "Computing the nearest correlation matrix a problem from finance," IMA Journal of Numerical Analysis, 22(3):329-343, 2002.
Idrissi, K. et al., "Multi-Component Entropy Segmentation for Color Image Retrieval," Image and Signal Processing and Analysis, 2001, pp. 132-137.
Irani, M., et al., "Motion analysis for image enhancement: Resolution, occlusion and transparency," Journal of Visual Communication and Image Representation, 1993, 24 pages.
"Iteratively reweighted least squares," Wikipedia, Last Modified Jun. 23, 2009, 2 pages, [online] [Retrieved on Jul. 14, 2009] Retrieved from the internet <URL:http://en.wikipedia.org/wiki/Iteratively_reweighted_least_squares>.
Jain, A. K., et al., "Statistical pattern recognition: A review," IEEE Transactions on Pattern Analysis and Machine Intelligence, 22(1):4-37, 2000.
Jiang, X. et al., Correlation-based intrinsic image extraction from a single image. In ECCV, 2010.
Ke, Y. et al., "Efficient Near-Duplicate Detection and Sub-Image Retrieval," ACM Multimedia, 2004, pp. 1-9.
Korah, T., et al., "Analysis of building textures for reconstructing partially occluded facades," European Conference on Computer Vision, 2008, 14 pages.
Kumar, N., et al., "What is a good nearest neighbors algorithm for finding similar patches in images," ECCV, 2008.
Kwatra, V., et al., "Graphcut textures: Images and video synthesis using graph cuts," ACM Transactions on Graphics, Jul. 2003, pp. 277-286, vol. 22, No. 3.
Kwatra, V., et al., "Shadow Removal for Aerial Imagery by Information Theoretic Intrinsic Image Analysis," International Conference on Computational Photography, IEEE, 2012, 8 pages.
Kwatra, V., et al, "Texture optimization for example-based synthesis," ACM Transactions on Graphics, SIGGRAPH, 2005, pp. 795-802, vol. 24, No. 3.
Lalonde, J.-F. et al., Detecting ground shadows in outdoor consumer photographs. In ECCV, 2010.
Lefebvre, S., et al., "Parallel controllable texture synthesis," ACM SIGGRAPH, 2005, pp. 777-786.
Liu, F. et al., Texture-consistent shadow removal. In ECCV, 2008.

(56) References Cited

OTHER PUBLICATIONS

Maxwell, B. et al., A bi-illuminant dichromatic reflection model for understanding images. In CVPR, 2008.

Mohan, A., et al., "Editing soft shadows in a digital photograph," IEEE Computer Graphics and Applications, 2007, pp. 23-31, vol. 27, No. 2.

Muller, P., et al., "Image -based procedural modeling of facades," ACM Transactions on Graphics, Jul. 2007, pp. 85-1 to 85-10, vol. 26, No. 3.

Narasimhan, S. et al., A class of photometric invariants: Separating material from shape and illumination. In ICCV, 2003.

Oliva, A. et al., "Building the Gist of a Scene: The Role of Global Image Features in Recognition," Progress in Brain Research, 2006, pp. 1-19.

Park, M., et al., "Deformed Lattice Detection via Mean-Shift Belief Propagation," European Conference on Computer Vision (ECCV), Oct. 2008, pp. 474-485.

Pauly, M., et al., "Discovering structural regularity in 3rd geometry," ACM Transactions on Graphics, 2008, 11 Pages.

PCT International Search Report and Written Opinion, PCT/US2011/062787, May 4, 2012, 8 Pages.

Porikli, W. F., et al., "Fast construction of covariance matrices for arbitrary size image windows," In Proc. Intl. Conf. on Image Processing, pp. 1581-1584, 2006.

Principe, J. C. et al., Information-theoretic learning using renyi's quadratic entropy. In Proceedings of the First International Workshop on Independent Component Analysis and Signal Separation, Aussois, pp. 407-412, 1999.

Qi, J., et al., "Fast computation of the covariance of map reconstructions of pet images," vol. 3661, pp. 344-355, 1999.

Rahman, M. et al., "A Feature Level Fusion in Similarity Matching to Content-Based Image Retrieval," 2006 $9^{th}$ International Conference on Information Fusion, 2006, pp. 1-6.

Raoui, Y. et al., "Global and Local Image Descriptors for Content Based Image Retrieval and Object Recognition," Applied Mathematical Sciences, 2010, pp. 2109-2136, vol. 5, 2011, No. 42.

Salvador, E., et al., "Cast shadow segmentation using invariant color features, Computer vision and image understanding," Computer Vision and Image Understanding, 2004, pp. 238-259, vol. 95.

Schindler, G., et al. "Detecting and matching repeated patterns for automatic geo-tagging in urban environments," Computer Vision and Pattern Recognition, CVPR, 2008, pp. 1-7.

Shor, Y. et al., The shadow meets the mask: Pyramid-based shadow removal. In Eurographics, 2008.

Shotton, J., et al., "Semantic texton forest for image categorization and segmentation," Computer Vision and Pattern Recognition, CVPR, 2008, pp. 1-8.

Smeulders, A. et al., "Content-Based Image Retrieval at the End of the Early Years," IEEE Transactions on Pattern Analysis and Machine Intelligence, 2000, pp. 1349-1380, vol. 22, No. 12.

Stein, C., et al., "Improving the usual estimator of a normal covariance matrix," Dept. of Statistics, Stanford University, Report 37, 1972.

Sun, J., et al., "Image hallucination with primal sketch priors," Computer Vision and Pattern Recognition, 2003, 8 pages.

Tappen, M. et al., Recovering intrinsic images from a single image. IEEE Trans. Pattern Anal. Mach. Intell., 2005.

Torralba, A., et al., "Context-based vision system for place and object recognition," Proceedings. Ninth IEEE International Conference, Oct. 13-16, 2003, pp. 273-380, vol. 1.

Vazquez, E., et al., "Image segmentation in the presence of shadows and highlights," Computer Vision—ECCV, 2008, 14 pages.

Wang, Q., et al., "Patch based blind image super resolution," ICCV 2005. Tenth IEEE International Conference, Oct. 17-21, 2005, pp. 709-716, vol. 1.

Wang, H., et al., "Factoring repeated content within and among images," International Conference on Computer Graphics and Interactive Techniques, ACM SIGGRAPH 2008, 10 pages.

Weiss, Y. Deriving intrinsic images from image sequences. In ICCV, 2001.

Wu, T.-P. et al., A bayesian approach for shadow extraction from a single image. In ICCV, 2005.

Wu, T., et al., "Natural shadow matting," ACM Transactions on Graphics, Jun. 2009, Pages, vol. 26, Issue 2, Article 8.

Yang, J. et al., "Evaluating Bag-of-Visual-Worlds Representations in Scene Classification," MIR, 2007, pp. 197-206.

Zhao, T., et al., "Segmentation and tracking of multiple humans in complex situations," CVPR, 2001, 8 Pages.

Zhu, J. et al., Learning to recognize shadows in monochromatic natural images. In CVPR, 2010.

\* cited by examiner

FACADE ILLUMINATION REMOVAL

BACKGROUND

1. Field of Art

The present disclosure generally relates to the field of digital image processing, and more specifically, to methods of estimating illuminations in images.

2. Background of the Invention

Many current information systems store large quantities of digital images, such as map applications that provide views of the surrounding area for a given map location. However, many of these images include undesirable characteristics such as uneven ambient illumination that degrade the content of the images. For example, some map systems contain many images of buildings, sometimes obtained from multiple sources. Typically, these images vary in image quality depending on the location of where the image was taken or the time of day that the image was captured. Such images may include an uneven illumination caused by neighboring buildings or illumination effects caused by window reflections. The presence of uneven illumination in images results in undesirable characteristics due to the lack of uniformity of color intensity in the images. As a result, these systems provide users with images of less than desirable quality.

SUMMARY

The problems described above are met by a computer-implemented method, a computer program product and a computer system for removing illumination variation from an image. One embodiment of the computer-implemented method comprises selecting an image comprising color pixels with varying illumination. Instances of a repeating pattern in the image are determined. Illumination values for illuminated pixels at locations within instances of the repeating pattern are calculated based on pixel intensities of non-illuminated pixels at corresponding locations in other instances of the repeating pattern. The illumination variation from the illuminated pixels is removed based on the calculated illumination values to produce enhanced pixels. Color from the non-illuminated pixels at the corresponding locations in other instances of the repeating pattern is propagated to the enhanced pixels.

Embodiments of the computer program product store computer-executable code for removing illumination variation from an image. The code is executable to perform steps comprising selecting an image comprising color pixels with varying illumination. The steps further include determining instances of a repeating pattern in the image and calculating illumination values for illuminated pixels at locations within instances of the repeating pattern based on pixel intensities of non-illuminated pixels at corresponding locations in other instances of the repeating pattern. The steps further remove the illumination variation from the illuminated pixels based on the calculated illumination values to produce enhanced pixels and propagate color from the non-illuminated pixels at the corresponding locations in other instances of the repeating pattern to the enhanced pixels.

Embodiments of the computer system for removing illumination variation from an image comprises a computer processor and a computer-readable storage medium storing executable code that is executed by the computer processor to perform steps comprising selecting an image comprising color pixels with varying illumination. The steps further include determining instances of a repeating pattern in the image and calculating illumination values for illuminated pixels at locations within instances of the repeating pattern based on pixel intensities of non-illuminated pixels at corresponding locations in other instances of the repeating pattern. The steps further remove the illumination variation from the illuminated pixels based on the calculated illumination values to produce enhanced pixels and propagate color from the non-illuminated pixels at the corresponding locations in other instances of the repeating pattern to the enhanced pixels.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
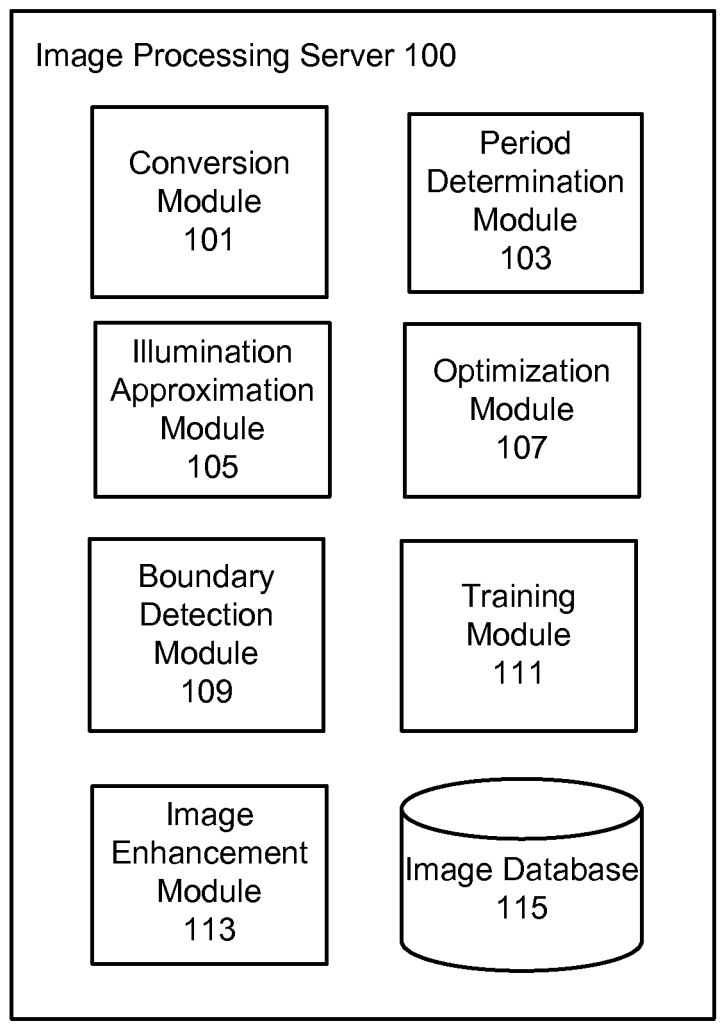
FIG. 1 is a high-level block diagram of an image processing server in accordance with one embodiment.

FIG. 1 is a high-level block diagram illustrating a detailed view of an image processing server 100 for estimating illumination values in illuminated images for illumination variation removal purposes in accordance with one embodiment. In one embodiment, an illuminated image comprises an image showing a scene having ambient illumination such as shadows. An illuminated image may be represented as an underlying non-illuminated image and an illumination map. In one embodiment, the illumination map describes the illumination value at each location (x, y) in an image.

Note that the illumination described by the illumination map may vary across the illuminated image. For example, part of the illuminated image can be in shadow and therefore have decreased illumination relative to the remainder of the image. Under this formulation, moreover, an "illumination" can describe both a shadow where light is occluded from an object, and a bright area, such as a specular reflection, where lift is reflected from an object. Shadows and bright areas are simply variations in the illumination map.

Thus, this description uses the term "illumination" to encompass variations in pixel intensity caused by occlusions. An occlusion-type illumination (i.e., a shadow) can be present in an image, for example, when sunlight incident upon an object (e.g., a building) shown in the image is partially occluded by a cloud or other object. Thus, the occlusion results in a portion of the image being darker than other portions. A reflection-type illumination can be present in an image, for example, when a window of a building presents a specular reflection to the camera, resulting in a bright spot in the image. Another general example of an illumination occurs when the illumination value varies smoothly over an image due to gradually changing ambient lighting conditions.

In one embodiment, the observed pixel intensity I of a given pixel in an illuminated image at location (x,y) is based on the following factors:

The luminance S that describes a scalar illumination value of the illumination map for the pixel at location (x, y); and The reflectance R that describes the pixel intensity of the pixel's underlying reflectance value (i.e., the non-illuminated value) for the pixel at location (x, y).

The relationship of these factors to each other is represented by the following equation:

$$I = S \cdot R \quad (1)$$

In equation 1, the pixel intensity I of a pixel in the illuminated image is the product of the pixel's underlying reflectance value (i.e., non-illuminated value) R and a scalar illumination value S, where S represents the value of the illumination map at location (x,y).

Generally, the image processing server 100 estimates values of an illumination (i.e., illumination intensities) present in an illuminated image. In one embodiment, the illuminated image is a color image comprising a repetitive pattern. The image processing server 100 may estimate the illumination values based at least in part on the periodicity of an illuminated image. The periodicity of an image is the period of the repeating pattern found in the image. An example of a repeating pattern found in an image is a repeating pattern of windows on a façade of a building. The image processing server 100 operates under the assumption that the pixel intensity for a given pixel should be equivalent to a corresponding pixel in a neighboring period. A difference in the pixel intensity of the two corresponding pixels is assumed to be caused by a variation in illumination and is used by the image processing server 100 to estimate the illumination map for the image.

In one embodiment, by comparing a known pixel intensity for a given pixel to a known pixel intensity of a corresponding pixel in a neighboring period, the image processing server 100 can estimate the illumination values that contribute to the pixel intensities. In one embodiment, the image processing server 100 enhances an illuminated image by removing illumination variation from the image based on the estimated illumination values of the pixels in the image. That is, the image processing server 100 corrects the illumination variation present in the image so that the intensity of the illumination in the image is uniform.

In one embodiment, removing illumination variation from an image may result in the image losing color information in the portions of the image that previously contained the illumination variation. The image processing server 100 may enhance the image by copying color information from periodic neighbors in the non-illuminated portions of the image (e.g., non-shadowed portions) to the portions of the image where the illumination variation has been removed. In one embodiment, the technique of copying color information is referred to herein as "colorization."

In one embodiment, removing illumination variation from an image may result in the image losing texture information in addition to the color information. For example, in an illuminated image illustrating a façade of a building, removing the illumination variation from the image may result in the image losing a repetitive pattern of windows in the area in which the illumination variation was removed. The image processing server 100 may enhance the image by copying (i.e., expanding) textural information from periodic neighbors in the non-illuminated portions of the image (e.g., non-shadowed portions) to the portions of the image where the illumination variation has been removed. In one embodiment, the technique of copying textural information is referred to herein as inpainting.

As illustrated in FIG. 1, the image processing server 100 comprises various modules including a conversion module 101, a period determination module 103, an illumination approximation module 105, an optimization module 107, a boundary detection module 109, a training module 111, an image enhancement module 113, and an image database 115. As is known in the art, the term "module" refers to computer program logic utilized to provide the specified functionality. Thus, a module can be implemented in hardware, firmware, and/or software. In one embodiment, program modules are stored on a non-transitory computer-readable storage medium (i.e., a computer program product), loaded into a memory, and executed by a computer processor. Additionally, those of skill in the art will recognize that other embodiments of the image processing server 100 shown in FIG. 1 can have different and/or other modules than the ones described here, and that the functionalities can be distributed among the modules in a different manner.

The image database 115 stores a set of illuminated images. The term "image" as employed herein includes image data in general, such as individual still image files or frames of images from a video file. In one embodiment, the images in the image database 109 may be obtained from a variety of sources, such as from an organization producing aerial or street view images of a portion of a city for use with a map system, such as GOOGLE MAPS, STREET VIEW or GOOGLE EARTH. Likewise, images (including videos) may be obtained from users, e.g. as submitted by a user uploading images to a photo repository such as PICASA WEB, or a video repository such as YOUTUBE or GOOGLE VIDEO.

In one embodiment, at least some of the illuminated images stored in the image database 115 exhibit a repetitive pattern. For example, an image may show a façade of a building with a repeating pattern of windows or an image may show a rug that exhibits a repetitive pattern in its design. In one embodiment, at least some of the illuminated images stored in the image database 115 are color images.

Additionally, the image database 115 stores enhanced versions of the illuminated images. In one embodiment, an enhanced version of an illuminated image comprises only the underlying non-illuminated image. That is, the image database 115 stores versions of the images with the variations in the illumination map removed, so that the illumination across the image is uniform and any shadows, reflections, other illumination-related artifacts are absent. Additionally, the image database 115 may store images that have been enhanced via colorization or inpainting. In one embodiment, the image database 115 stores indications of non-illuminated portions of images.

The conversion module 101 converts an illuminated image from a first color model to a second color model. In one embodiment, images stored in the image database 115 are RGB images. The conversion module 101 selects an illuminated image and converts the image from a RGB color model to a YUV color model. As is known in the art, the YUV color model defines a color space in terms of a luma (Y) component and two chrominance (UV) components. In particular, the (Y) component of the YUV color model describes the illuminated image without color (i.e., grayscale representation of the illuminated image). In contrast, the (UV) components of the YUV color model describe color information of the illuminated image. By converting an illuminated image into a YUV image, the image processing server 100 may operate on the (Y) component of the illuminated image to identify the illumination variation in the image.

Figure 2:
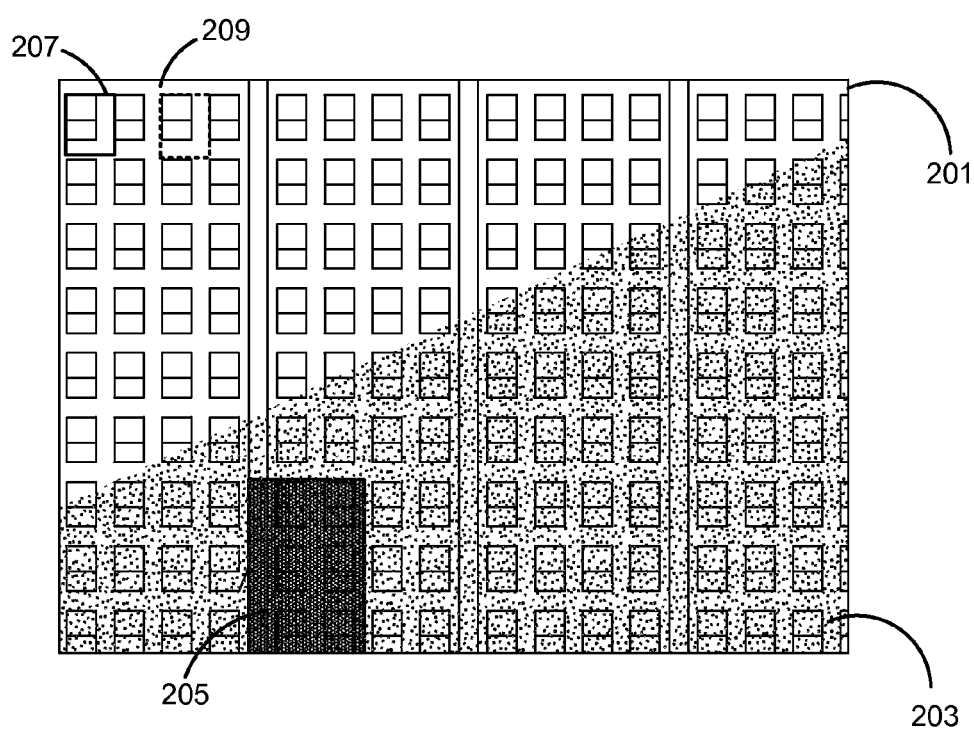
FIG. 2 illustrates an illuminated image of a building that includes varying illumination in accordance with one embodiment.

The period determination module 103 analyzes an illuminated image to determine a period of a repetitive pattern within it. Particularly, the period determination module 103 may analyze the (Y) component of the illuminated image to determine the period of the repetitive pattern in the image. The image undergoing analysis may include one or more repetitive patterns. However, for ease of description, the functionality of the period determination module 103 is described in reference to an image with a single repetitive pattern. Referring now to FIG. 2, there is shown an example of an illuminated image 201 selected from the image database 115. Image 201 illustrates a façade of a building with a repetitive pattern of windows and an illumination represented by the plurality of dots in the image 201. In this example, the illumination represents a shadow in the image 201. As shown in FIG. 2, the illumination varies in the image 201. The illumination may comprise a first illumination 203 and a second illumination 205. The second illumination 205 represents a darker shadow compared to shadow of the first illumination 203.

Referring back to FIG. 1, by comparing an illuminated image to a shifted version of the illuminated image, the period determination module 103 determines the period of a repetitive pattern present in the image. The period describes the distance in pixels before a pattern in an illuminated image repeats in a spatial dimension, such as the x-dimension. In one embodiment, the period determination module 103 extracts the periodic structure of the image by repeatedly determining differences between pixel intensities in the illuminated image and a version of the image that is shifted in a dimension.

Figures 3A, 3B:
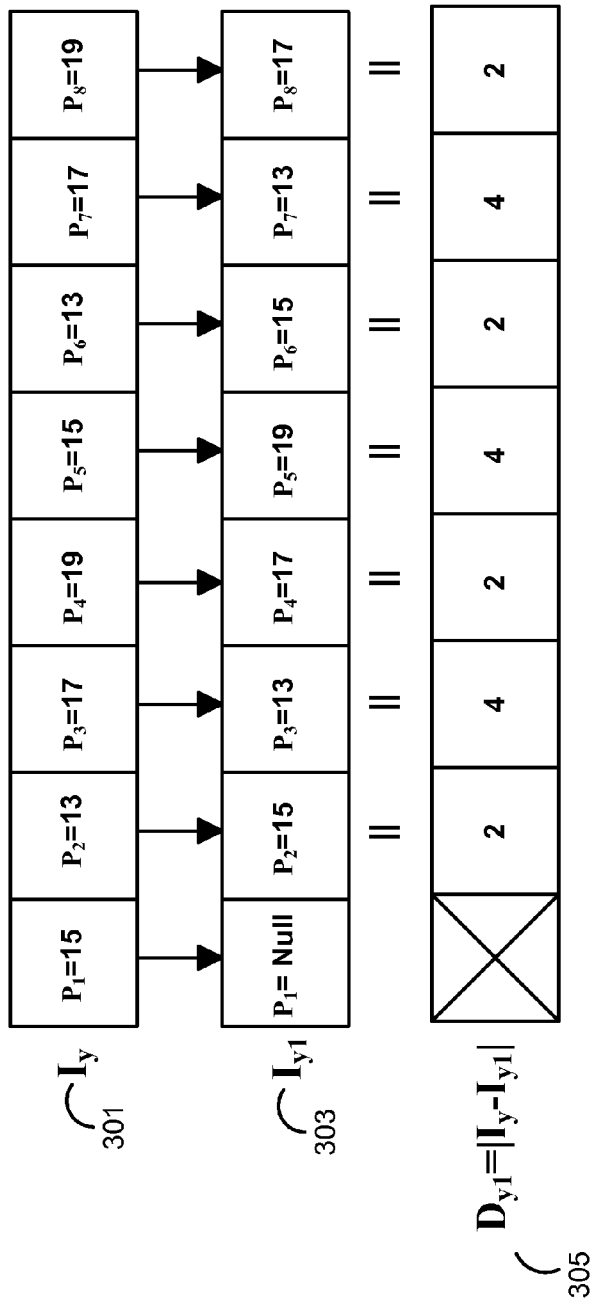
FIGS. 3A-3B illustrate a visual representation of the processes involved in the determination of a period of an image in accordance with one embodiment.

Assume dataset $I_y$ comprises pixel intensity values for each pixel from the selected image in the x-dimension at a particular coordinate in the y-dimension, where the individual pixel intensities in $I_y$ are referred to as $P_1, P_2, P_3, \ldots P_K \ldots P_M$ where K represents the pixel location of each pixel in the image in the x-dimension and $P_K$ represents the pixel intensity at location K. M denotes the total number of pixels in a row (i.e., along the x-dimension). Referring now to FIG. 3A, there is shown an example of a dataset of pixels $I_y$ 301. $I_y$ 301 represents the pixel intensity of each pixel from an image in the x-dimension at a particular y-location in the image. For example, $P_1$ is associated with the first pixel in the x-dimension and has a pixel intensity of 15 whereas the second pixel in the x-dimension, $P_2$, has a pixel intensity of 13, and so on.

In one embodiment, the period determination module 103 calculates the summation of the absolute value of the differences ($D_{yN}$) between $I_y$ and shifted values of pixel intensity ($I_{yN}$) for pixels in the x-dimension at a position y in the y-dimension of the image. In one embodiment, the individual pixel intensities of $I_{yN}$ are referred to as $P_{1-N}, P_{2-N}, P_{3-N}, \ldots P_{K-N} \ldots P_{M-N}$, where K-N represents the pixel location of each pixel in the shifted image in the x-dimension and $P_{K-N}$ represents the pixel intensity at location K-N. M-N is the total number of valid pixels in the shifted row. The summation can be represented by the following equation according to one embodiment:

$$D_{yN} = \sum_K |P_K - P_{K-N}| \qquad (2)$$

In equation 2, y represents a position or coordinate (i.e., a row) in the y-dimension and N represents the number of pixel shifts in the x-dimension relative to location (K) within the row designated by the y-position. That is, the period determination module 103 selects a y-coordinate along which to sum the shifted values of pixel intensity in the x-dimension. For example, an N-value of 1 represents a pixel shift of one in the x-dimension from a given pixel location in the non-shifted image whereas an N-value of 5 represents a pixel shift of five in the x-dimension from the location. For each N-value up to a threshold based on an estimation of the maximum period in the image, the period determination module 103 calculates the difference in pixel intensity for each pixel location in the original non-shifted image and the pixel intensity of a location N shifts from the location.

Referring back to FIG. 3A, dataset $I_{y1}$ 303 represents dataset $I_y$ 301 with a shift of one pixel (i.e., N=1). Thus, the first pixel ($P_1$) in $I_{y1}$ 303 has a null pixel intensity value since there is no proceeding pixel in $I_y$ 301 proceeding $P_1$. The second pixel ($P_2$) in $I_{y1}$ 303 is equivalent to the first pixel ($P_1$) in dataset $I_y$ 301, thus representing the shift of one pixel. Dataset $D_{y1}$ 305 represents the absolute value of the difference of dataset $I_y$ 301 and dataset $I_{y1}$ 303. That is, dataset $D_{y1}$ 305 illustrates for each pixel instance in $I_y$ 301, the difference between the pixel intensity of a given pixel in the dataset and the pixel intensity of a corresponding pixel in $I_{y1}$ 303. In one embodiment, the difference between a given pixel in the dataset $I_y$ 301 and the pixel intensity of a corresponding pixel in $I_{y1}$ 303 with a null value is ignored as illustrated by the "X" in dataset $D_{y1}$ 305.

Once the period determination module 103 has calculated the differences of pixel intensity for each pixel location for a given N-value, the period determination module 103 sums the pixel intensity differences in dataset ($D_{yN}$) to generate a total pixel intensity for the N-value. In the example shown in FIG. 3A, the summation of $D_{y1}$ results in a total pixel intensity value of 20 for the difference image. The period determination module 103 performs the above process for each N-value thereby generating a total pixel intensity value for each N-value at location y in the image. The period determination module 103 repeats the process described above to generate a total pixel intensity value in the x-dimension for each y-location in the image.

In one embodiment, the period determination module 103 arranges the N-values in ascending order along with each N-value's corresponding total pixel intensity. Since the image under analysis includes a repetitive pattern, the total pixel intensity values of the difference images will repeat after a number of N-values. In one embodiment, the period determination module 103 analyzes the pixel intensity values of the difference images to determine the N-value associated with the local minimum total pixel intensity. To determine the local minimum total pixel intensity, the period determination module 103 determines the N-value associated with the first minimum total pixel intensity. Since the pixel intensity values are periodic, the first minimum total pixel intensity repeats at various instances of N. These repeating values are said to be the minimum values of the difference images.

However, due to noise and illumination variations in the original image, these values may not be equivalent at the various instances. The period determination module 103 selects as the local minimum total pixel intensity, the value associated with the smallest total pixel intensity from among all the minimum values. The N-value associated with the local minimum total pixel intensity is set as the period of the repetitive image in the x-dimension. In one embodiment, after computing the period in the x-dimension for each y-value, the period determination module 103 determines the most common period among all y-values as the period of the repetitive image in the x-dimension. That is, the period determination module 103 selects the x-period that occurs more frequently among all values of y.

In an alternative embodiment, the period determination module 103 analyzes the pixel intensity differences of the difference image to determine the N-value with the first local minimum total pixel intensity value. The period determination module 103 then analyzes the pixel intensity differences to determine the N-value associated with the next local minimum total pixel intensity difference. In one embodiment, the period of the image corresponds to the number of shifts between the two N-values. Once the number of shifts between the two N-values is determined, the period determination module 103 sets the period of the repetitive image in x-dimension to the determined number of shifts.

An example of the analysis performed by the period determination module 103 to determine the period of a repetitive pattern in the x-dimension is shown in FIG. 3B. Graph 307 illustrates the values of total pixel intensity, where N is represented along the x-axis and increases iteratively. For example, total pixel intensity value 309 illustrates the total pixel intensity value where N is equivalent to two. As noted above, since the image under analysis includes a repetitive pattern, the total pixel intensity values will repeat. In this example, the N-value associated with the first local minimum total pixel intensity value in graph 307 is associated with the N-value of four 311. The N-value associated with the second local minimum total pixel intensity value is associated with the N-value of eight 313. Thus, in this example, the minimum total pixel intensity values are associated with the N-values of four and eight. Assuming that the total pixel intensity value for the N-value of four is smaller than the value at the N-value of eight, the value at the N-value of four is considered the local minimum total pixel intensity value. Thus, the period of the image in the x-dimension is set to four.

Note that the functionality of the period determination module 103 described above with respect to the x-dimension can also be applied to determine the period of an image in the y-dimension. The description of the period determination module 103 was limited to the x-dimension in order to simplify the description of the period determination module 103.

Referring back to FIG. 1, in one embodiment, the illumination approximation module 103 determines mean (i.e., average) pixel intensities in regions (i.e., instances) of an illuminated image. In one embodiment, the illumination approximation module 103 applies a box filter to the illuminated image and determines the mean pixel intensity of the pixels within the box defined by the filter. The mean pixel intensity can be used as an estimate of the illumination values in the image. According to one embodiment, the size of the box filter in the x and y dimensions (e.g., 15 pixels by 17 pixels) is equivalent to the period of the repetitive pattern in the x and y dimensions for the illuminated image as determined by the period determination module 103.

In one embodiment, the box filter functions as a sliding window that moves across the image in a left-to-right, top-to-bottom order. An embodiment of the box filter moves one pixel at a time, although embodiments can increment by different amounts. The illumination approximation module 103 determines the mean pixel value within each iteration of the box according to the following equation:

$$\overline{S}_{ij} = \frac{\sum I_p}{PBF} \text{ where } p \in BF_{ij} \tag{3}$$

In equation 3, the illumination approximation module 103 identifies the pixel intensity I for each pixel p operating under the constraint that the pixel p is confined to the area in the box filter (BF) centered on location (ij). The illumination approximation module 103 calculates the sum of the pixel intensities of the pixels confined within the box and divides the sum by the number of pixels within the box (PBF). The number of pixels within the box (PBF) is equivalent to the product of the period of the repetitive pattern in the x and y dimensions according to one embodiment. The resulting value is the mean pixel value $\overline{S}_{ij}$ of the pixels within the box filter at that instance of the filter. In one embodiment, the mean pixel value of an instance of the filter is associated with the pixel located at the center of the instance of the filter (ij).

In one embodiment, the illumination approximation module 103 inverses the mean pixel value of each instance of the box filter as follows:

$$S_{ij} = 1/\overline{S}_{ij} \tag{4}$$

In the above equation, $S_{ij}$ represents the inversed mean pixel value of $\overline{S}_{ij}$ for an instance of the box filter. To generate a plurality of inversed mean pixel values for the image, for each instance of the box filter, the illumination approximation module 103 inverses the associated mean pixel value for the given instance of the box filter $\overline{S}_{ij}$. The resulting values are considered the inversed mean pixel values $S_{ij}$ for the illuminated image.

Referring back to FIG. 2, FIG. 2 shows an example of a box filter. The box 207 represented by the solid line indicates the first position of the box filter. The illumination approximation module 103 determines an inversed mean pixel value for the pixels within the box 207 according to the techniques described above. Box 209 illustrated by the dashed line represents another position of the box filter as it iterates across the image. Note that box 209 does not necessarily represent the second position of the box filter and is merely exemplary of another position of the box filter. The illumination approximation module 103 similarly determines an inversed mean pixel intensity value for the pixels within the box 209 according to the techniques described above. This process is repeated until the illumination approximation module 103 has determined an inversed mean pixel value for each instance of the box filter in the image 201.

Referring back to FIG. 1, the optimization module 107 applies an energy function to solve for illumination values for pixels in an image. In one embodiment, the energy function is represented by equation 5 shown below which is subject to the constraint that the sum of the illumination values of an image is equal to one.

$$E = \sum_{mn}\sum_{ij} |S_{ij}I_{ij} - S_{(i+mp_x)(j+np_y)}I_{(i+mp_x)(j+np_y)}|^2 + \beta \sum_{ij}\sum_{xy \in N(ij)} |S_{ij} - S_{xy}|^\alpha \quad (5)$$

where $$\sum_{ij} S_{ij} = 1$$

As shown above in equation 5, the energy E is a sum of two terms. The first term measures the difference between pixel intensities of periodically related pixel instances, where $(S_{ij}I_{ij})$ represents the underlying pixel intensity at a given location (ij) and $(S_{(i+mp_x)(j+np_y)}I_{(i+mp_x)(j+np_y)})$ represents the underlying pixel intensity of a corresponding pixel at a location that is a multiple of the period (p) away from the given location (ij). According to one embodiment, the period in the x-dimension ($p_x$) may be different than the period in the y-dimension ($p_y$) or they may be equivalent. In one embodiment, m and n are integers from a small negative value to a small positive value, such as negative two to positive two. These variables account for periodically-related pixels in both the x and y dimensions and adjust the number of periodic neighborhoods that are included in the energy function. Typically, the pixel intensity $I_{ij}$ of a given pixel is known and by multiplying the pixel intensity by the inverse illumination value $S_{ij}$ (i.e., the inverse of the illumination value in the image), which is unknown, the illumination component of the pixel intensity is removed resulting in the underlying (i.e., non-illuminated) pixel intensity at that particular location.

In one embodiment, a given pixel may not have a corresponding pixel that is a period away from the location of the given pixel in one dimension. However, these pixels typically have a corresponding pixel that is a period away in another dimension or in another direction of the dimension. For example, a given pixel at the bottom right corner of an image may not have a corresponding pixel to the right of the given pixel in the x-dimension or below in the y-dimension, but the given pixel may have a corresponding pixel above the pixel's location in the y-dimension above the pixel or to the left of the location for the pixel in the x-dimension. An embodiment of the optimization module 107 accounts for the boundary of an image taking into account periodically-related pixels in different directions of the x and y dimensions.

In one embodiment, the second term of the energy function smoothes the illumination values within a region of an image. The optimization module 107 operates under the assumption that the illumination values of pixels within the region should be of equivalent or similar intensity. In the second term of the energy function, the optimization module 107 compares illumination values of neighboring pixels of a given pixel at location (ij), where (ij) is constrained within a region (N). According to one embodiment, the region may be a 3×3 region or a 5×5 pixel region. The second term of the energy function is based on the summation of differences between the illumination value $S_{ij}$ of the given pixel at location (ij) and the illumination values of neighboring pixel instances ($S_{xy}$) at locations (xy) within the region described by N.

Furthermore, the second term of the energy function is multiplied by a constant β as set by an image analyst associated with the image processing server 100. In one embodiment, β is a weight that controls the smoothing factor of the illumination values represented by the second term of the energy function. The second term of the energy function is also raised to a power of α, where α determines how smooth the boundary is between regions with different levels of illumination. In one embodiment, different optimization techniques are used for different α values. According to one embodiment, α is less than or equal to two but can also be values greater than two. When α is equal to two, the boundary in the image between differently-illuminated portions of the image is smooth. In contrast, when α is less than two, the boundary between the portions of the image is sharper.

In one embodiment, to solve for the illumination values S, the optimization module 107 uses the inversed mean pixel values $S_N$ provided by the illumination approximation module 103 and normalizes these values to initialize the solution for the energy function. As previously mentioned, each inversed mean pixel value is associated with the (ij) location that corresponds to the center pixel of an instance of the box filter. The optimization module 107 solves for the illumination values of these locations using the inversed mean pixel values. The optimization module 107 then iteratively optimizes the energy function for each pixel location to solve for the illumination value that minimizes the energy function for all locations in order to improve upon the values provided by the illumination approximation module 105.

In one embodiment, the optimization module 107 applies quadratic programming techniques to solve for the illumination values if the energy function is a second order equation (i.e., α=2). Solving the energy function using quadratic programming results in smooth changes in the illumination map for the image (e.g., smooth changes on the boundaries of shadowed and non-shadowed regions of the image). In one embodiment, if the energy function is not a second order equation (i.e., α≠2), the optimization module 107 applies the technique of iteratively re-weighted least squares to solve for the illumination values thereby producing sharper changes in the illumination map. Regardless of the technique used, the optimization module 107 creates a matrix, the illumination map, having illumination values (i.e., inverse illumination values) for every pixel location in the image. Each illumination value in the matrix describes the intensity of the illumination at a particular location in the image.

The boundary detection module 109 identifies the boundary between non-illuminated portion(s) and illuminated portion(s) of an illuminated image. In one embodiment, the boundary detection module 109 determines boundary by identifying a mask for non-illuminated (e.g., non-shadowed) pixels in the image. The boundary detection module 109 constrains the illumination for the pixels in the mask such that the illumination is zero. To identify the mask, the boundary detection module 109 applies k-means clustering (e.g., k is equal to 4) to the illuminated image. As a result, the illuminated image is divided into a plurality of clusters where each cluster has an associated scalar illumination value corresponding to the average scalar illumination value of the pixels associated with the illumination values in the cluster. The boundary detection module 109 identifies a pixel cluster from the plurality of pixel clusters that represents non-illuminated pixels of the image based on the scalar illumination values of the clusters.

In one embodiment, for façade images with periodic patterns, the boundary detection module 109 applies K-means clustering on illumination values resulting from the box filtering and optimization described above to divide the image into a plurality of pixel clusters. The boundary detection module 109 identifies the plurality of pixel clusters based on the average scalar illumination values of the illuminated façade image.

To identify the pixel cluster representing non-illuminated pixels of the image, the initialization module 101 extracts features from the plurality of clusters to form feature vectors that describes the clusters. In one embodiment, the extracted features comprise the mean scalar illumination value $\overline{S}$ of the pixels from the cluster i, the cluster size (i.e., number of pixels in the cluster), the variance of the scalar illumination values of the pixels in the cluster, the mean intensity value $\overline{I}$ of the image, the mean height (in pixels) of the clusters, and the normalized mean intensity value of other clusters j that are not selected as the non-illuminated cluster i such that: $\overline{I}_j \cdot S_i / S_j$ where pixel i≠pixel j. The intuition is that if the selected pixel cluster i represents the non-illuminated cluster, the illumination value $S_i$ of the pixel at the center of cluster i and the illumination value $S_j$ of the pixel at the center of cluster j together would normalize the pixels from the other clusters, including illuminated clusters, to the right intensity.

When applied to an image—or more specifically, to the feature vectors of the image—the boundary detection module 109 generates information that describes a measure of how strongly each cluster represents a cluster of non-illuminated pixels. To generate the information, the boundary detection module 109 applies a set of weights that are associated with features of non-illuminated pixels to a feature vector. Based on the applied weights and the feature vector, the boundary detection module 109 calculates a score which may be a Boolean score representing whether or not a given cluster represents a non-illuminated pixel cluster. Alternatively, the score is a real number (e.g., ranging from 0.0 to 1.0), integer, or other scalar value representing a measure of likelihood or probability that the cluster represents a non-illuminated pixel cluster. In one embodiment, numbers or scores exceeding some threshold can be considered to indicate that the cluster represents a non-illuminated pixel cluster. In one embodiment, the cluster with a highest score that exceeds the threshold is considered the non-illuminated pixel cluster (i.e., the non-shadow portion of the illuminated image).

The boundary detection module 109 outputs a mask for each pixel in the image based on the identification of the non-illuminated pixel cluster. In one embodiment, a mask indicates whether an associated pixel comprises an illumination (i.e., a shadow) or does not comprise an illumination (i.e., non-shadow). Thus, the mask for each pixel included in the non-illuminated pixel cluster indicates that the pixel is a non-illuminated pixel. Conversely, the mask for each pixel included in an illuminated pixel cluster indicates that the pixel is an illuminated pixel.

In one embodiment, the training module 111 trains the boundary detection module 113 to identify pixel clusters that represent non-illuminated pixels using a training set of illuminated images (e.g., 90 images). The training set of illuminated images may be stored in the image database 115. Each image from the training set includes an indication (e.g., a label) of non-illuminated (e.g., non-shadowed) portions of the image. The training module 111 identifies pixel clusters of the image and extracts the features of the image as previously described above. In one embodiment, the training module 111 assigns a positive label (e.g., +1) to the dominant pixel cluster (i.e., the largest pixel cluster) representing the non-illuminated portion of the image which was designated in the image and assigns a negative label (e.g., −1) to all other clusters. The pixel clusters assigned the negative label include other pixel clusters representing non-illuminated portions of the image and other illuminated portions of the image which are not dominant.

The training module 111 applies a training algorithm to the boundary detection module 113 to learn the set of weights on the features of the training set that are associated with the dominant pixel cluster as previously described above so that the boundary detection module 109 can recognize non-illuminated portions of illuminated images. In one embodiment, the training algorithm is AdaBoost, the details of which are known to one having ordinary skill in the art.

The image enhancement module 113 enhances illuminated images based on the optimized illumination values determined by the optimization module 107. In one embodiment, the image enhancement module 113 enhances an image by removing illumination variation from the image. Particularly, to remove the illumination variation (i.e., correct the varying illumination in the image), the image enhancement module 113 multiplies the pixel intensity I of each pixel whose mask indicates that the pixel comprises an illumination by the optimized inverse illumination value S for that pixel as determined by the optimization module 107, thereby removing the value of the illumination component from the pixel. By multiplying the inverse of the optimized illumination values for the illuminated pixels by the pixel intensities of the pixels, the image enhancement module 113 removes the illumination map component of the illuminated image. The enhanced image has uniform intensity such that any shadows, reflections, or other illumination-related artifacts are absent from the image. The image enhancement module 113 stores the enhanced image in the image database 109.

In one embodiment, the image enhancement module 113 enhances an image by adding color to pixels (i.e., colorizing) for which the illumination component has been removed. Pixels for which the illumination component has been removed are considered enhanced pixels whereas pixels comprising an illumination are considered illuminated pixels in one embodiment. By removing the illumination component from an illuminated pixel, the image enhancement module 113 also removes color information from the pixel. In one embodiment, the image enhancement module 113 restores color information to enhanced pixels by propagating color information from non-illuminated (i.e., non-shadow) periodic neighbors of the enhanced pixels.

The image enhancement module 113 determines whether to add color to an enhanced pixel based on values of the YUV components of the illuminated image prior to enhancement. Specifically, for an enhanced pixel, the image enhancement module 113 analyzes the value of the Y-component for the pixel. A Y-component value above a threshold value indicates that the pixel is not too illuminated (i.e., not too dark) such that the textural information for the pixel is preserved in the illuminated image. If the Y-component value is above the threshold value, the image enhancement module 113 propagates or copies color information from the UV components from the enhanced pixel's periodic pixel neighbors that are located in a non-illuminated (i.e., non-shadowed) portion of the image. That is, the image enhancement module 113 copies color information from UV components of a neighboring pixel located at a position that is a period away from the pixel in the image.

Alternatively, rather than determining whether to apply colorization at a pixel-by-pixel basis, the image enhancement module 113 performs a similar analysis at the pixel cluster level. The image enhancement module 113 may enhance an image by identifying the average Y-component value for an illuminated pixel cluster. The image enhancement module 113 propagates an average UV-component value from a periodic cluster neighbor from a non-illuminated portion of the image if the Y-component value for the illuminated pixel cluster is above the threshold.

In one embodiment, the image enhancement module 113 enhances an image by adding color and intensity information to pixels (i.e., inpainting) for which the illumination component has been removed. By removing the illumination component from an illuminated pixel, the image enhancement module 113 may also remove the intensity (i.e., texture) of the pixel in addition to the pixel's color information. By removing intensity information from pixels, details of the underlying image that is represented by the pixels are lost. For example, in a façade of a building, a repetitive pattern of windows may be removed from the image when the illumination is removed from the image. In one embodiment, the image enhancement module 113 restores the intensity and color to enhanced pixels by propagating both intensity information and color information from non-illuminated (e.g., non-shadow) periodic neighbors.

The image enhancement module 113 determines whether to add intensity information and color information to an enhanced pixel based on values of the YUV components of the illuminated image. Specifically, for an enhanced pixel, the image enhancement module 113 analyzes the value of the Y-component for that pixel. A Y-component value below a threshold value indicates that the pixel is too illuminated (i.e., too dark) resulting in the textural information for the pixel being lost when the illumination from the pixel is removed. If the Y-component value is below the threshold value, the image enhancement module 113 propagates or copies both the intensity information from the Y-component and the color information from the UV components from the enhanced pixel's pixel neighbors that are located in a non-illuminated (i.e., non-shadowed) portion of the image. By propagating both the intensity information and the color information to the pixel, the image enhancement module 113 restores the texture and color in the pixel. Alternatively, the image enhancement module 113 may apply inpainting at a cluster level rather than at a pixel-by-pixel basis as previously described above with respect to colorization.

Figure 4:
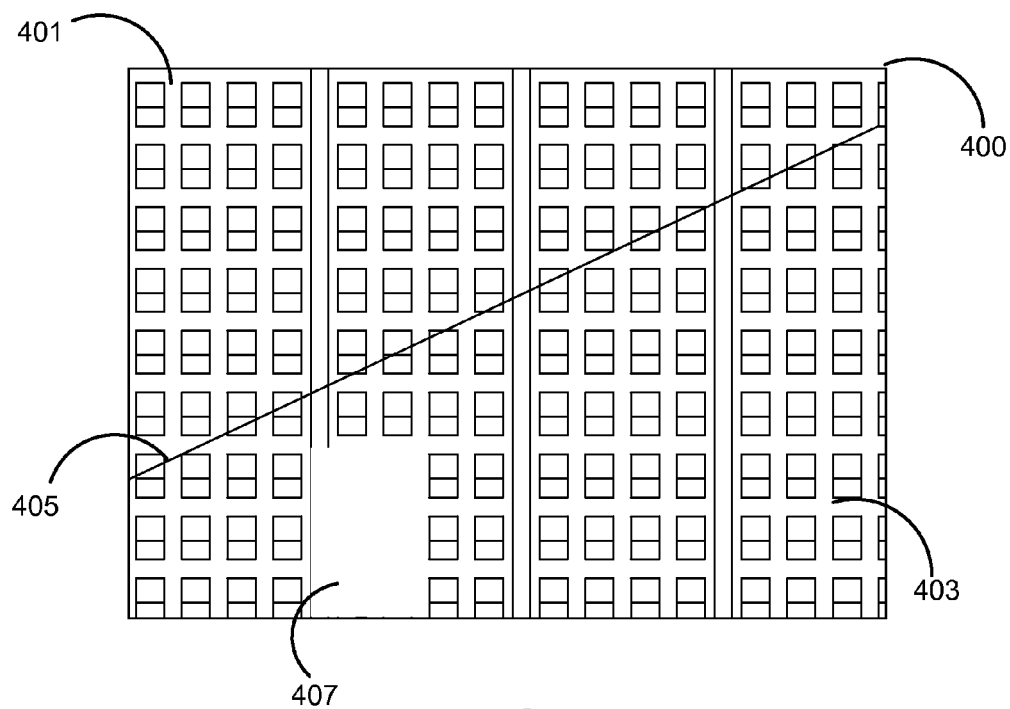
FIG. 4 illustrates the image shown in FIG. 2 with the illumination removed from the illuminated image in accordance with one embodiment.

Referring now to FIG. 4, image 400 is an enhanced version of the illuminated image 201 illustrated in FIG. 2. In image 400, the illumination (i.e., the shadow) from image 201 is removed. However, removal of the illumination from image 201 has resulted in the color information and textural information being lost. Portion 403 of image 401 corresponds to an enhanced portion of the image in which the illumination has been removed. As a result of enhancement, portion 403 has lost its color information in comparison to portion 401 which corresponds to a non-illuminated portion of the original illuminated image. Line 405 illustrates a color border between the non-illuminated portion of the image 401 and the enhanced portion 403 resulting from enhancement. Furthermore, enhanced portion 403 includes portion 407 in which both the color information and textural information was lost as a result of enhancement. Because the illumination 205 from FIG. 2 was too dark, removal of the illumination 205 resulted in the loss of texture and color.

Figure 5:
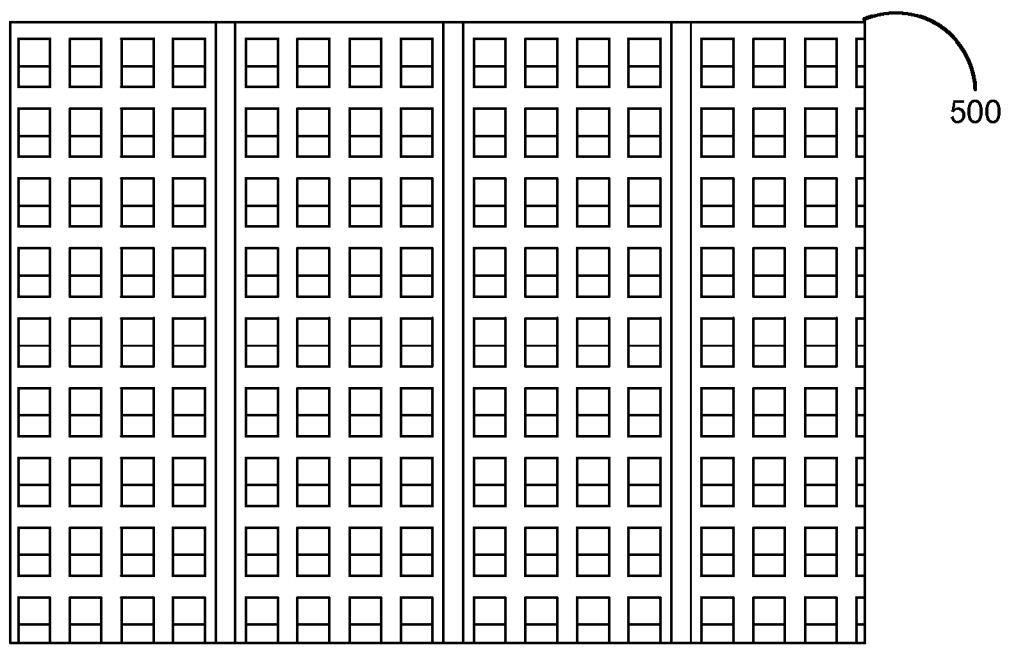
FIG. 5 illustrates the image shown in FIG. 4 with colorization and inpainting applied to the image in accordance with one embodiment.

Referring now to FIG. 5, image 500 illustrates an enhanced version of image 400 illustrated in FIG. 4. As shown in image 500, color and texture is uniform throughout image 500 as a result of the application of colorization and inpainting by the image processing server 100.

Figure 6:
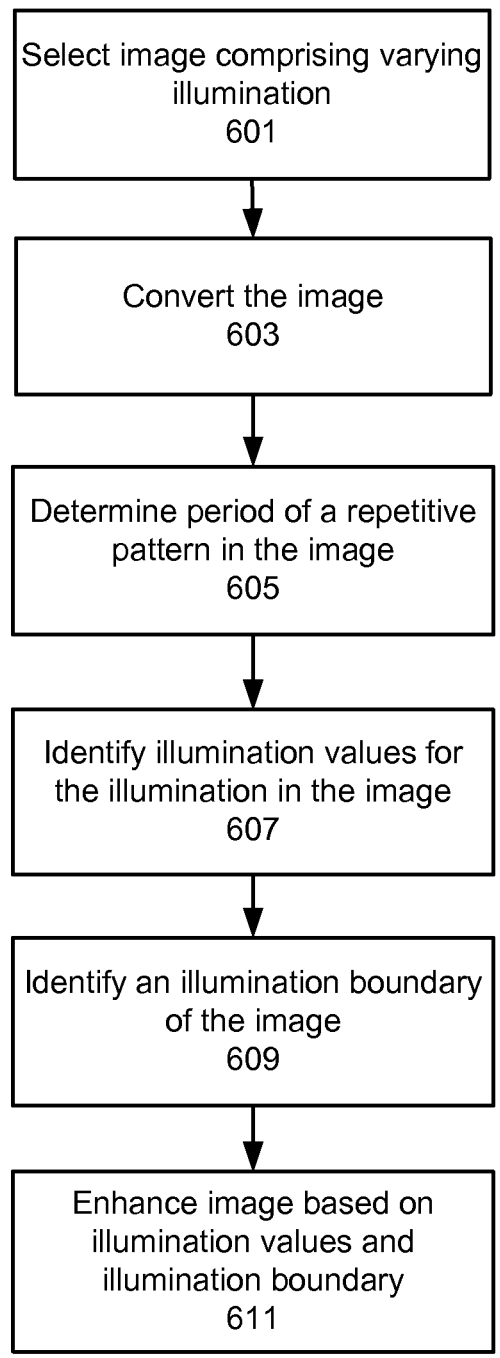
FIG. 6 is a flowchart illustrating steps performed by the image processing server to enhance an illuminated image in accordance with one embodiment.

FIG. 6 is a flowchart illustrating steps performed by the image processing server 100 to remove illumination variation from an image. Other embodiments perform the illustrated steps in different orders, and/or perform different or additional steps.

In one embodiment, the image processing server 100 selects 601 an image comprising varying illumination. The selected image also exhibits a repetitive pattern. The image processing server 100 converts 603 the image from the RGB color model to the YUV color model. The image processing server 100 determines 605 a period of a repetitive pattern in the image. The image processing server 100 identifies 607 illumination values for the illumination in the image based on the repetitive pattern in the image. The image processing server 100 identifies 609 an illumination boundary of the image. The illumination boundary is indicative of the non-illuminated portion(s) and illuminated portion(s) of the image. The image processing server 100 enhances 611 the image based on the illumination values and illumination boundary. That is, the image processing server 100 removes the illumination from the illuminated portion of the image. The image processing server 100 may also apply colorization and/or inpainting to enhance the image.

Figure 7:
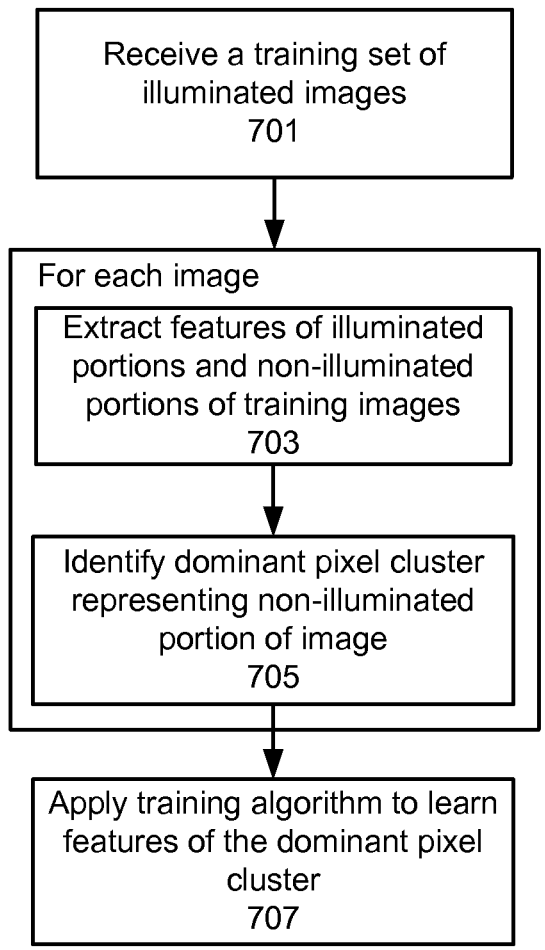
FIG. 7 is a flowchart illustrating steps performed by the image processing server to train a classifier to identify non-illuminated portions of an illuminated image in accordance with one embodiment.

FIG. 7 is a flowchart illustrating steps performed by the training module 111 to to train the image processing server 100 to identify non-illuminated portions of an illuminated image according to one embodiment. Other embodiments perform the illustrated steps in different orders, and/or perform different or additional steps.

In one embodiment, the training module 111 receives 701 a training set of illuminated images. Each image from the training set includes an indication of a non-illuminated portion(s) of the image. For each image, the training module 111 extracts 703 features of illuminated portions and non-illuminated portions of the image and identifies 705 the dominant pixel cluster representing a non-illuminated portion of the image. In one embodiment, the dominant pixel cluster is associated with the largest pixel cluster of non-illuminated pixels. The training module 111 applies 707 a training algorithm to learn the extracted features of the dominant pixel cluster. Through the above training, the image processing server 100 can identify non-illuminated portion(s) of an illuminated image.

Figure 8:
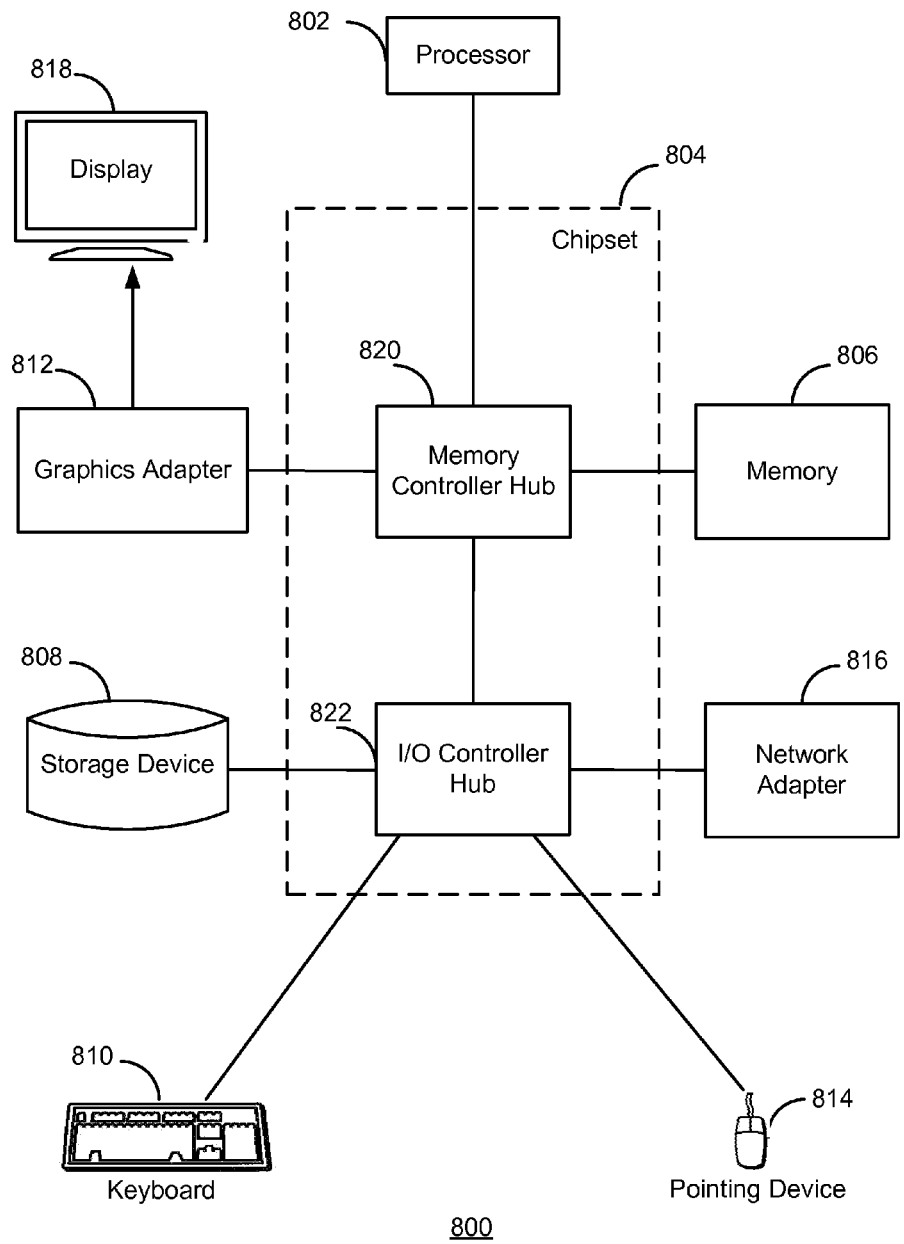
FIG. 8 is a high-level block diagram illustrating a typical computer for use as an image processing server according to one embodiment.

FIG. 8 is a high-level block diagram of a computer 800 for acting as an image processing server 100 according to one embodiment. Illustrated are at least one processor 802 coupled to a chipset 804. Also coupled to the chipset 804 are a memory 806, a storage device 808, a keyboard 810, a graphics adapter 812, a pointing device 814, and a network adapter 816. A display 818 is coupled to the graphics adapter 812. In one embodiment, the functionality of the chipset 804 is provided by a memory controller hub 820 and an I/O controller hub 822. In another embodiment, the memory 806 is coupled directly to the processor 802 instead of the chipset 804.

The storage device 808 is any non-transitory computer-readable storage medium, such as a hard drive, compact disk read-only memory (CD-ROM), DVD, or a solid-state memory device. The memory 806 holds instructions and data used by the processor 802. The pointing device 814 may be a mouse, track ball, or other type of pointing device, and is used in combination with the keyboard 810 to input data into the computer system 800. The graphics adapter 812 displays images and other information on the display 818. The network adapter 816 couples the computer system 800 to a local or wide area network.

As is known in the art, a computer 800 can have different and/or other components than those shown in FIG. 8. In addition, the computer 800 can lack certain illustrated components. In one embodiment, a computer 800 acting as an image processing server 100 lacks a keyboard 810, pointing device 814, graphics adapter 812, and/or display 818. Moreover, the storage device 808 can be local and/or remote from the computer 800 (such as embodied within a storage area network (SAN)). As is known in the art, the computer 800 is adapted to execute computer program modules for providing functionality previously described herein. In one embodiment, program modules are stored on the storage device 808, loaded into the memory 806, and executed by the processor 802.

The disclosure herein has been described in particular detail with respect to one possible embodiment. Those of skill in the art will appreciate that other embodiments may be practiced. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments disclosed herein include process steps and instructions described herein in the form of an algorithm. It should be noted that the process steps and instructions could be embodied in software, firmware or hardware, and when embodied in software, could be downloaded to reside on and be operated from different platforms used by real time network operating systems.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The embodiments disclosed herein are well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

What is claimed is:

1. A computer-implemented method of removing illumination variation from an image, the method comprising:
    selecting an image comprising color pixels with varying illumination;
    determining instances of a repeating pattern in the image;
    calculating illumination values for illuminated pixels at locations within instances of the repeating pattern, the calculation based on pixel intensities of non-illuminated pixels at corresponding locations in other instances of the repeating pattern;
    removing the illumination variation from the illuminated pixels based on the calculated illumination values to produce enhanced pixels; and
    propagating color from the non-illuminated pixels at the corresponding locations in other instances of the repeating pattern to the enhanced pixels.

2. The computer-implemented method of claim 1, wherein propagating color from the non-illuminated pixels to the enhanced pixels comprises, for an enhanced pixel:
    determining a value associated with a grey scale representation of an illuminated version of the enhanced pixel; and
    propagating color to the enhanced pixel responsive to the determined value indicating that textural information associated with the illuminated pixel is preserved, the color propagated from a corresponding non-illuminated pixel from another instance of the repeating pattern.

3. The computer-implemented method of claim 1, wherein propagating color from the non-illuminated pixels to the enhanced pixels comprises, for an enhanced pixel:
    determining a value associated with a grey scale representation of the illuminated pixel; and
    propagating color values and intensity values to the illuminated pixel responsive to the determined value indicating that textural information associated with the illuminated pixel is not preserved, the color information and the intensity information propagated from a corresponding non-illuminated pixel from another instance of the repeating pattern.

4. The computer-implemented method of claim 1, further comprising:
    processing the image using an image classifier to identify a non-illuminated portion and an illuminated portion of the image.

5. The computer-implemented method of claim 4, wherein the calculated illumination values are inverse illumination values and wherein removing the illumination variation from the image comprises:
    for each illuminated pixel in the illuminated portion, multiplying a pixel intensity of the illuminated pixel by an inverse illumination value calculated for the illuminated pixel.

6. The computer-implemented method of claim 1, wherein determining instances of the repeating pattern comprises:

determining a period of the repeating pattern in a spatial dimension by determining differences in pixel intensities among the image and versions of the images shifted in the spatial dimension.

7. The computer-implemented method of claim 1, further comprising:
   determining dimensions of the repeating pattern in the image;
   defining regions of pixels of the image based on the dimensions of the repeating pattern; and
   determining mean pixel intensities of pixels within the defined regions;
   wherein the illumination values for the illuminated pixels are determined based on the mean pixel intensities.

8. The computer-implemented method of claim 1, wherein calculating illumination values for illuminated pixels comprises:
   optimizing an energy function to calculate an illumination value for an illuminated pixel within the instance of the repeating pattern based on a difference between a pixel intensity of the illuminated pixel and a pixel intensity of a non-illuminated pixel at a corresponding location in an adjacent instance of the repeating pattern and further based on a difference between the pixel intensity of the illuminated pixel and pixel intensities of neighboring pixels.

9. The computer-implemented method of claim 1, further comprising:
   training to identify pixel clusters that represent non-illuminated pixels using a training set of images with varying illumination, wherein each image from the training set includes an indication of non-illuminated portions of the image.

10. A computer program product comprising a non-transitory computer readable storage medium storing computer-executable code for removing illumination variation from an image, the code when executed perform steps comprising:
    selecting an image comprising color pixels with varying illumination;
    determining instances of a repeating pattern in the image;
    calculating illumination values for illuminated pixels at locations within instances of the repeating pattern, the calculation based on pixel intensities of non-illuminated pixels at corresponding locations in other instances of the repeating pattern;
    removing the illumination variation from the illuminated pixels based on the calculated illumination values to produce enhanced pixels; and
    propagating color from the non-illuminated pixels at the corresponding locations in other instances of the repeating pattern to the enhanced pixels.

11. The computer program product of claim 10, wherein propagating color from the non-illuminated pixels to the enhanced pixels comprises, for an enhanced pixel:
    determining a value associated with a grey scale representation of an illuminated version of the enhanced pixel; and
    propagating color to the enhanced pixel responsive to the determined value indicating that textural information associated with the illuminated pixel is preserved, the color propagated from a corresponding non-illuminated pixel from another instance of the repeating pattern.

12. The computer program product of claim 10, wherein propagating color from the non-illuminated pixels to the enhanced pixels comprises, for an enhanced pixel:
    determining a value associated with a grey scale representation of the illuminated pixel; and
    propagating color values and intensity values to the illuminated pixel responsive to the determined value indicating that textural information associated with the illuminated pixel is not preserved, the color information and the intensity information propagated from a corresponding non-illuminated pixel from another instance of the repeating pattern.

13. The computer program product of claim 10, the code when executed performs further steps comprising:
    processing the image using an image classifier to identify a non-illuminated portion and an illuminated portion of the image.

14. The computer program product of claim 13, wherein the calculated illumination values are inverse illumination values and wherein removing the illumination variation from the image comprises:
    for each illuminated pixel in the illuminated portion, multiplying a pixel intensity of the illuminated pixel by an inverse illumination value calculated for the illuminated pixel.

15. The computer program product of claim 10, wherein calculating illumination values for illuminated pixels comprises:
    optimizing an energy function to calculate an illumination value for an illuminated pixel within the instance of the repeating pattern based on a difference between a pixel intensity of the illuminated pixel and a pixel intensity of a non-illuminated pixel at a corresponding location in an adjacent instance of the repeating pattern and further based on a difference between the pixel intensity of the illuminated pixel and pixel intensities of neighboring pixels.

16. A computer system for removing illumination variation from an image, the system comprising:
    a computer processor; and
    a computer-readable storage medium storing executable code, the code when executed by the computer processor performs steps comprising:
        selecting an image comprising color pixels with varying illumination;
        determining instances of a repeating pattern in the image;
        calculating illumination values for illuminated pixels at locations within instances of the repeating pattern, the calculation based on pixel intensities of non-illuminated pixels at corresponding locations in other instances of the repeating pattern;
        removing the illumination variation from the illuminated pixels based on the calculated illumination values to produce enhanced pixels; and
        propagating color from the non-illuminated pixels at the corresponding locations in other instances of the repeating pattern to the enhanced pixels.

17. The computer system of claim 16, wherein propagating color from the non-illuminated pixels to the enhanced pixels comprises, for an enhanced pixel:
    determining a value associated with a grey scale representation of an illuminated version of the enhanced pixel; and
    propagating color to the enhanced pixel responsive to the determined value indicating that textural information associated with the illuminated pixel is preserved, the color propagated from a corresponding non-illuminated pixel from another instance of the repeating pattern.

18. The computer system of claim 16, wherein propagating color from the non-illuminated pixels to the enhanced pixels comprises, for an enhanced pixel:

determining a value associated with a grey scale representation of the illuminated pixel; and propagating color values and intensity values to the illuminated pixel responsive to the determined value indicating that textural information associated with the illuminated pixel is not preserved, the color information and the intensity information propagated from a corresponding non-illuminated pixel from another instance of the repeating pattern.

19. The computer system of claim 16, the code when executed performs further steps comprising:

processing the image using an image classifier to identify a non-illuminated portion and an illuminated portion of the image; and for each illuminated pixel in the illuminated portion, multiplying a pixel intensity of the illuminated pixel by an inverse illumination value calculated for the illuminated pixel.

20. The computer system of claim 16, wherein calculating illumination values for illuminated pixels comprises:

optimizing an energy function to calculate an illumination value for an illuminated pixel within the instance of the repeating pattern based on a difference between a pixel intensity of the illuminated pixel and a pixel intensity of a non-illuminated pixel at a corresponding location in an adjacent instance of the repeating pattern and further based on a difference between the pixel intensity of the illuminated pixel and pixel intensities of neighboring pixels.

* * * * *